Jan. 9, 1951     L. M. POTTS     2,537,420
MECHANICAL CIPHERING UNITS
Original Filed July 5, 1946     6 Sheets-Sheet 1
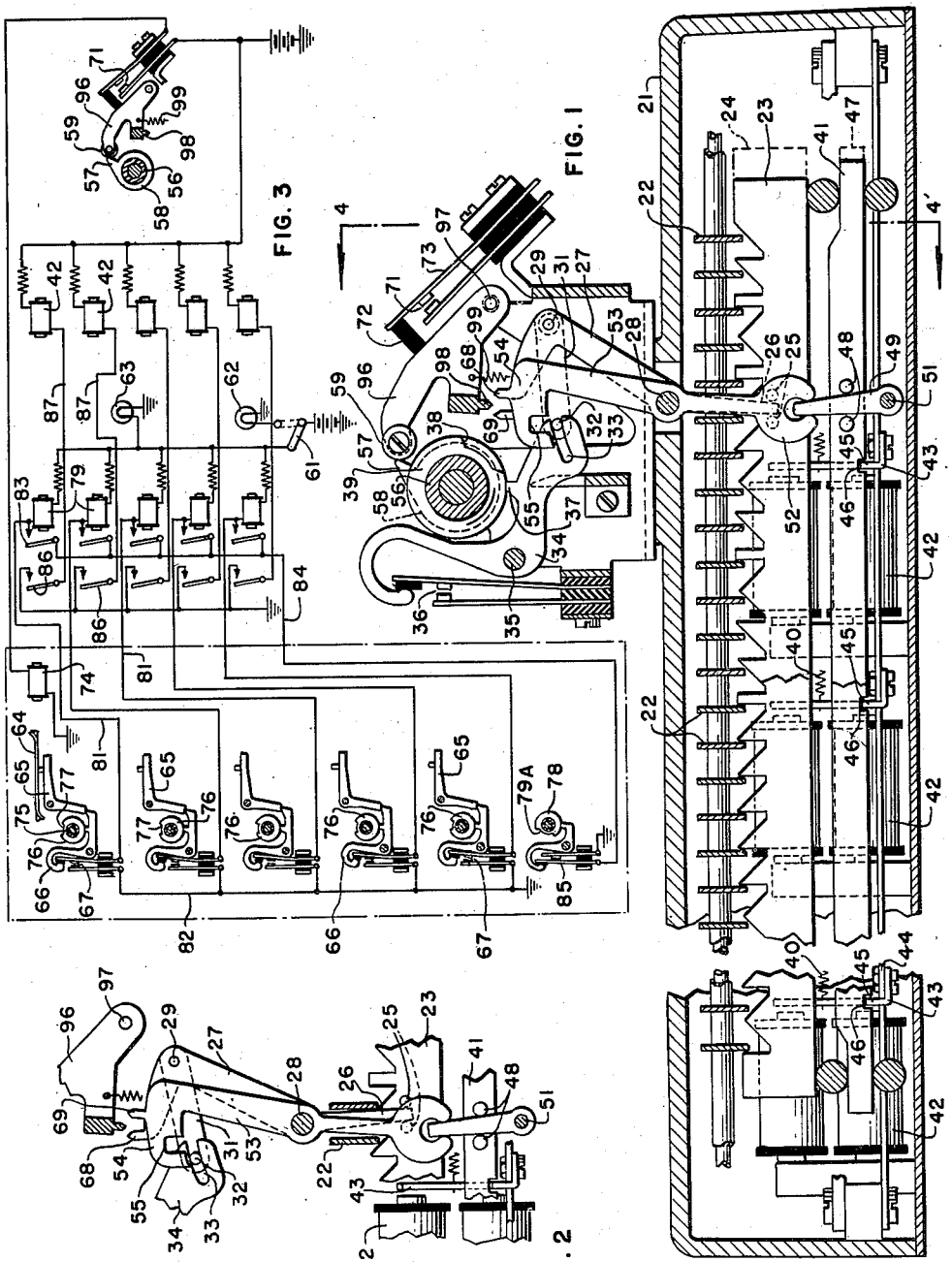
INVENTOR
LOUIS M. POTTS, DECEASED
MARTHA W. C. POTTS, EXECUTRIX
BY Emery Robinson
ATTORNEY Jan. 9, 1951 L. M. POTTS 2,537,420
MECHANICAL CIPHERING UNITS
Original Filed July 5, 1946 6 Sheets-Sheet 2

INVENTOR
LOUIS M. POTTS, DECEASED
MARTHA W. C. POTTS, EXECUTRIX
BY Emery Robinson
ATTORNEY Jan. 9, 1951 L. M. POTTS 2,537,420
MECHANICAL CIPHERING UNITS
Original Filed July 5, 1946 6 Sheets-Sheet 3

INVENTOR
LOUIS M. POTTS, DECEASED
MARTHA W. C. POTTS, EXECUTRIX
BY *Emery Robinson*
ATTORNEY Jan. 9, 1951　　　　　L. M. POTTS　　　　　2,537,420
MECHANICAL CIPHERING UNITS
Original Filed July 5, 1946　　　　　　　　　　6 Sheets-Sheet 4

INVENTOR
LOUIS M. POTTS, DECEASED
MARTHA W. C. POTTS, EXECUTRIX
BY Emery Robinson
ATTORNEY Jan. 9, 1951          L. M. POTTS          2,537,420
MECHANICAL CIPHERING UNITS
Original Filed July 5, 1946          6 Sheets—Sheet 5
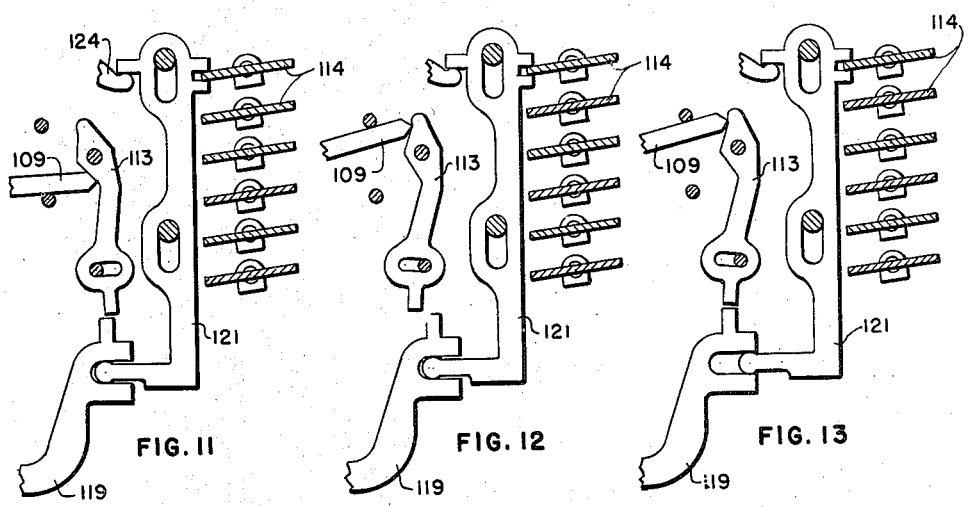
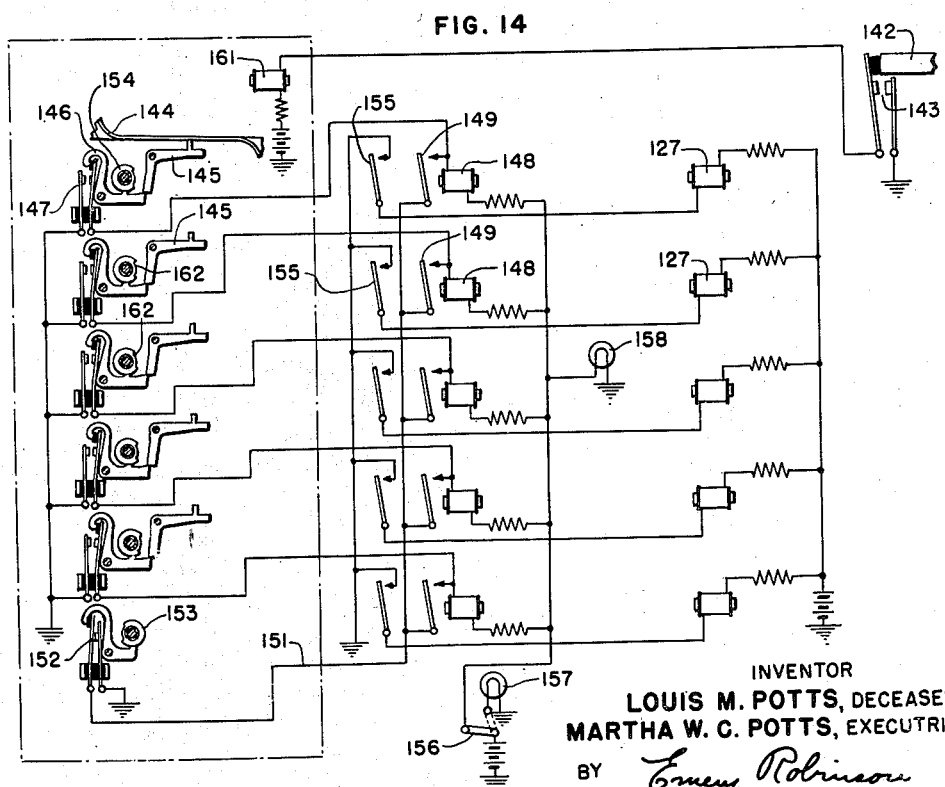
INVENTOR
LOUIS M. POTTS, DECEASED
MARTHA W. C. POTTS, EXECUTRIX
BY Emery Robinson
ATTORNEY Jan. 9, 1951            L. M. POTTS           2,537,420

MECHANICAL CIPHERING UNITS

Original Filed July 5, 1946           6 Sheets-Sheet 6

INVENTOR
LOUIS M. POTTS, DECEASED
MARTHA W. C. POTTS, EXECUTRIX
BY
Emery Robinson
ATTORNEY Patented Jan. 9, 1951

2,537,420

UNITED STATES PATENT OFFICE 2,537,420

MECHANICAL CIPHERING UNITS

Louis M. Potts, deceased, late of Evanston, Ill., by Martha W. C. Potts, executrix, Evanston, Ill., assignor to Teletype Corporation, Chicago, Ill., a corporation of Delaware Original application July 5, 1946, Serial No. 681,444, now Patent No. 2,504,044, dated April 11, 1950. Divided and this application November 5, 1948, Serial No. 58,504

9 Claims. (Cl. 178—22)

This invention relates to secret printing telegraph systems and particularly to mechanical ciphering units for accomplishing the enciphering and deciphering of telegraph messages.

This application is a division of copending application, Serial No. 681,444, filed July 5, 1946 and which issued as Patent No. 2,504,044 on April 11, 1950.

A chief object of the invention is the provision of mechanical ciphering units for secret telegraph message communication.

Another object of the invention is the provision of mechanisms for use with standard printing telegraph apparatus for performing ciphering operations.

A further object of the invention is the provision of circuit arrangements which can be conveniently used with the ciphering mechanisms in standard printing telegraph apparatus.

Other objects, features and advantages of the invention will appear as the description of the invention progresses.

The invention features the employment of key tape controlled coding magnets for use with a combined telegraph transmitting and printing apparatus of the type disclosed in the patent of S. Morton et al., 1,904,164, dated April 18, 1933. One set of magnets is used to furnish key signal code combinations which combine with original or plain English signal code combinations to encipher outgoing signals in a transmitter of the type disclosed in the Morton et al. patent, in which the well known Baudot start-stop system is utilized. In the type of ciphering employed in the instant invention a like condition of individual elements of the original signal code permutations and the individual elements of the key signal code permutations result in a spacing signal. On the other hand, unlike conditions of the elements result in a marking signal. For a more detailed description of such a system, reference should be had to the copending application Serial No. 462,522, filed October 19, 1942, in the name of Louis M. Potts and which issued as Patent 2,403,679 on July 9, 1946. The set of coding magnets used with the transmitter operate mechanical elements which combine with mechanical elements controlled from the printer keyboard to ultimately determine the position of the transmitting levers. For the printing operation a second set of coding magnets are provided which control mechanical elements which combine with the swords controlled from a selector magnet to ultimately determine the position of the selector vanes of the printer.

The code magnets for the transmitter and the receiver are controlled by suitable circuit arrangements. For particular use with this type of printing telegraph apparatus an additional circuit is provided whereby enciphered signals transmitted over an outgoing line are deciphered by the printer to print a plain English home record at the transmitting station and in which the same key tape is used for both enciphering and deciphering purposes.

The invention may be more readily comprehended by reference to the detailed description which follows when read with reference to the drawings in which:

Fig. 1 is a front sectional view, taken along line 1—1' of Fig. 4, in section, of a keyboard controlled transmitter particularly illustrating the transmitter used in the invention;

Fig. 2 is a detail view of a portion of the ciphering mechanism;

Fig. 3 is a schematic circuit particularly designed for use with the ciphering mechanism illustrated in Fig. 1;

Figure 15:
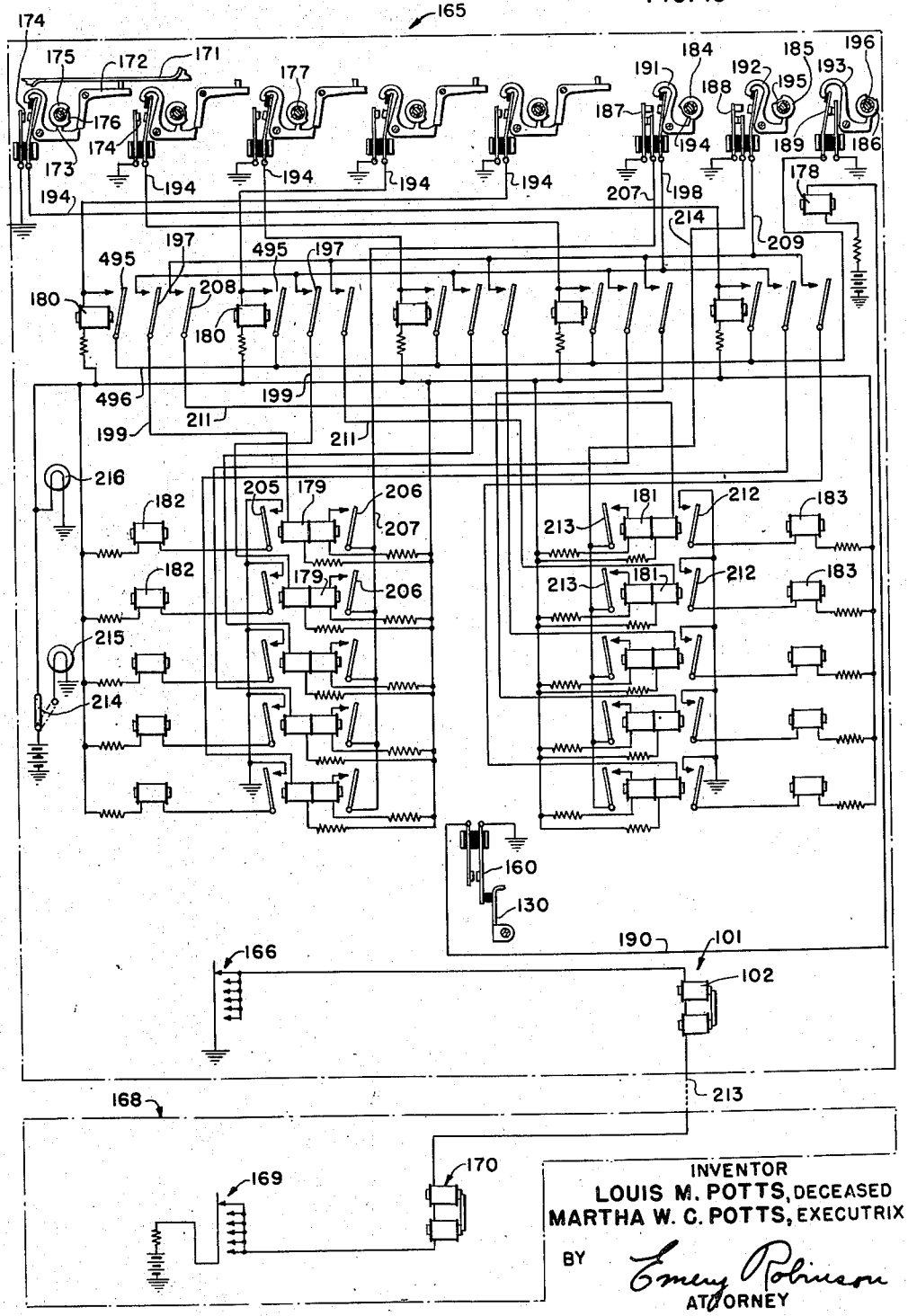

Figs. 11, 12, and 13 illustrate different positions of the selector swords and ciphering bars for the printing operation;

Fig. 14 is an illustration of the circuit used to control the coding magnets; and Fig. 15 is a modified form of the circuit designed for use with the invention.

Referring particularly to Figs. 1 to 6, inclusive, the portion of the first embodiment of the invention dealing with the keyboard controlled transmitter will be described. At the outset it will be assumed that for complete details of operation of the type of printing telegraph apparatus about to be described, reference should be had to the patent of S. Morton et al., already referred to, and for specific details of operation of the keyboard controlled transmitter per se, reference should be had to the United States patent of H. L. Krum, No. 1,595,472, dated August 10, 1926.

In Fig. 1 of the drawings a cast metal base is indicated at 21 upon which is mounted both the keyboard transmitter and the printing apparatus with which the present invention is concerned. The keyboard transmitter is controlled from a keyboard, not shown, wherein depression of a key lever 22 governs the positioning of the five permutation bars 23 housed within the base casting 21, either to the right or left position. As shown in Fig. 1 the foremost permutation bar 23 is in its leftward or marking position with the dotted line or spacing position of permutation bar 23 being indicated at 24.

Each permutation bar 23 carries a pair of pins 25 between which is positioned a depending arm 26 of a selecting finger 27 which is pivoted about the rod 28. Pivotally mounted to each finger 27 at 29, is a link 31 which carries a pin 32 designed to ride in an arcuate slot 33 formed on a transmitting lever 34. Each transmitting lever 34 is pivoted on a rod 35 and is of the conventional type wherein it closes an associated contact pair 36 when its lug 37 is permitted to enter a notch 38 of an associated transmitting cam 39. In addition to the five transmitting cams 39 the usual sixth start stop cam 18 (Fig. 4) and contact operating lever 19 are provided. It may now be seen that when a key lever 22 moves a permutation bar 23 to the right or spacing position selecting finger 27 will pivot at 28 in a counter-clockwise direction and when a permutation bar 23 is moved to the left an opposite effect will be produced.

Also mounted within the base casting 21 below permutation bars 23 are five ciphering bars 41 which are under the control of five coding magnets 42, as will now be described. The coding magnets 42 control the position of associated armatures 43 which are pivoted at 44. Upper extensions 45 of armatures 43 engage notches 46 of ciphering bars 41. Springs 48 attached to armatures 43 are normally effective to retain cipher bars 41 in their leftward or spacing position. When a particular coding magnet 42 is energized it will attract its armature 43 about its pivot 44 to force its associated ciphering bar 41 to the right, as shown in Fig. 1, to the dotted line marking position indicated at 47.

Mounted on each ciphering bar 41 are a pair of pins 48 which engage a lever 49 pivoted at 51 the free end of which is nested in the bifurcated end 52 of a ciphering lever 53. Each ciphering lever 53 is provided at its upper end with a laterally extending arm 54 having a notch 55 designed to cooperate with the pin 32 carried by arm 31 of selecting finger 27. It is now seen, Figs. 5 and 6, that if ciphering bar 31 is moved to its right, in response to a marking impulse received by its associated code magnet 42, lever 49 will pivot in a clockwise direction thereby pivoting ciphering lever 53 in a counterclockwise position. If, however, its associated code magnet 42 receives a spacing or non-energizing impulse, ciphering lever 53 will be retained in a clockwise position, Fig. 2.

Figure 4:
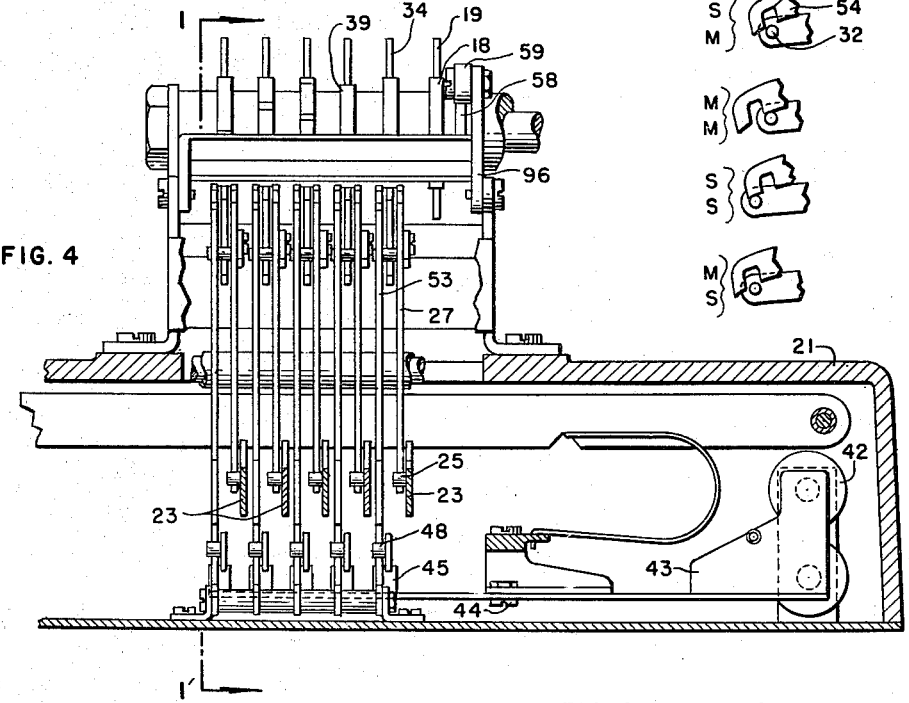
Fig. 4 is an end view of the keyboard controlled transmitter taken along the line 4—4' of Fig. 1.
Figure 7:
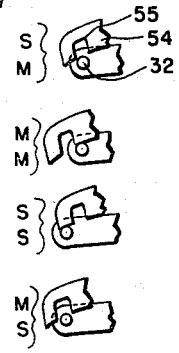
Fig. 7 is a chart illustrating the four possible conditions of the ciphering mechanism during an enciphering operation.
Figure 5:
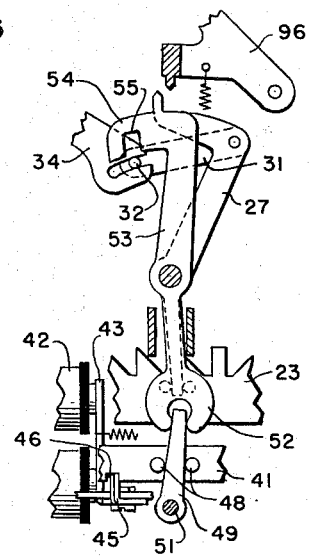
Figs. 5 and 6 are detail views of the ciphering mechanism.
Figure 6:
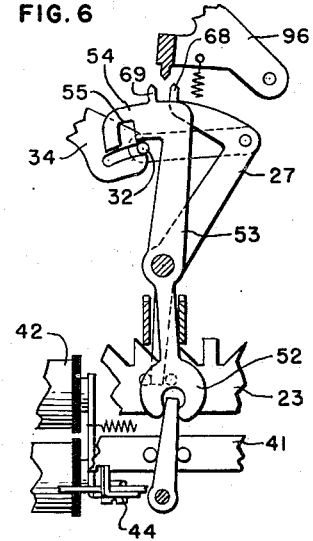
Figure 8:
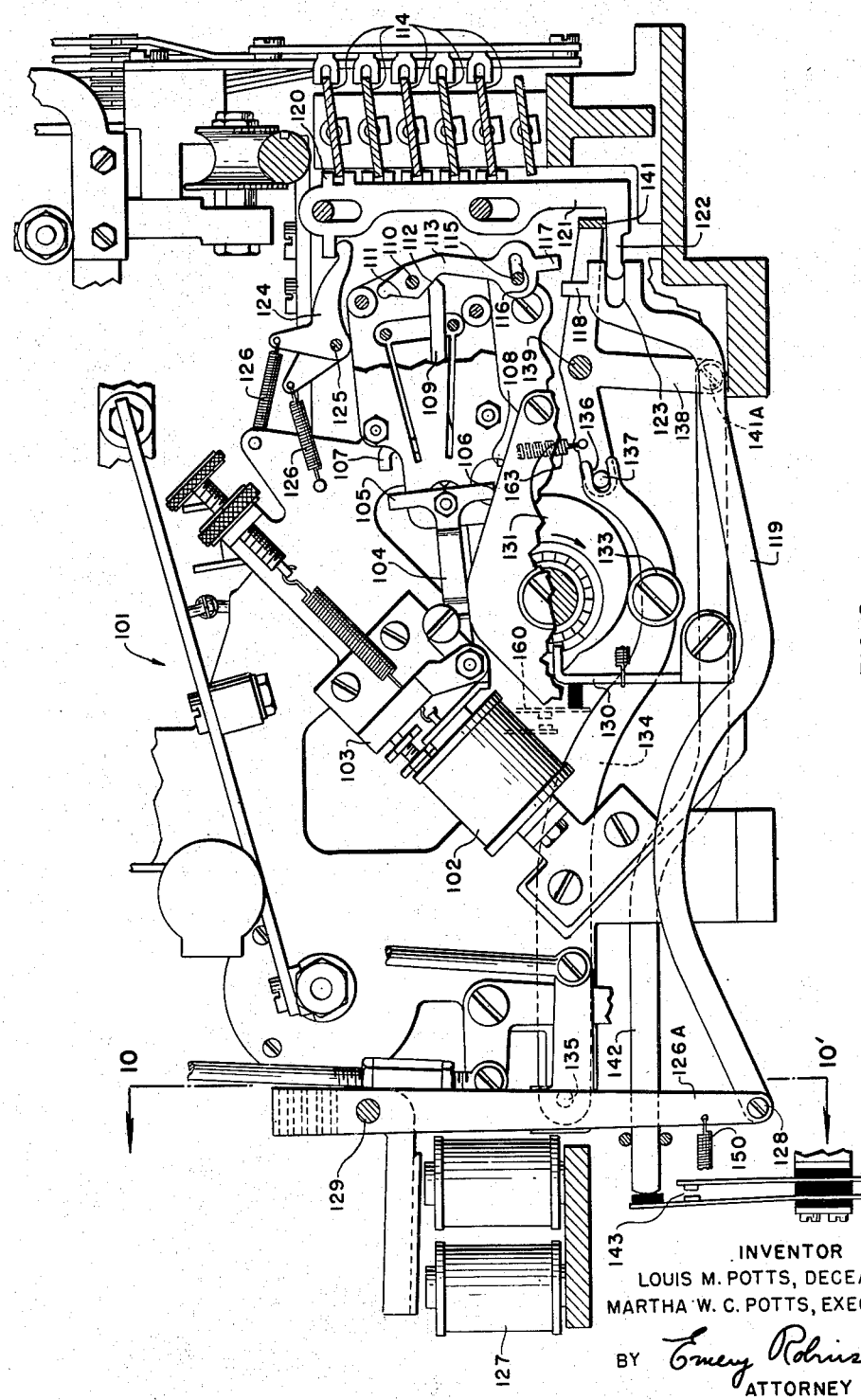
Fig. 8 is an end elevation of a telegraph printer with parts broken away and partly in section to illustrate the main features of the invention.
Figure 10:
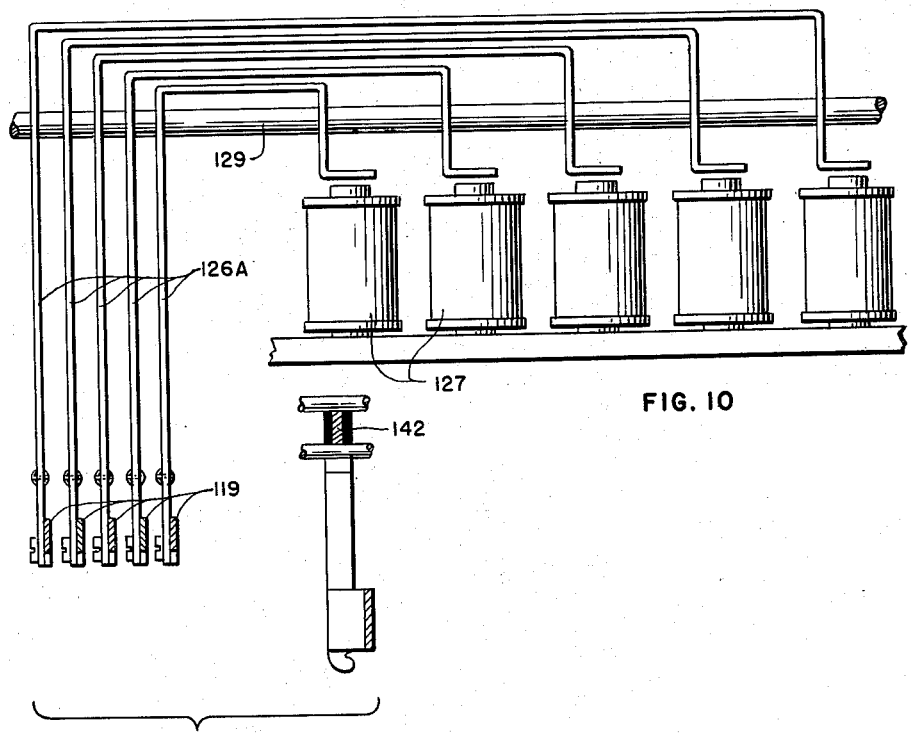
Fig. 10 is a detail view of the coding magnets and armature levers used for the printing ciphering operation taken on the line 10—10' of Fig. 8.
Figure 9:
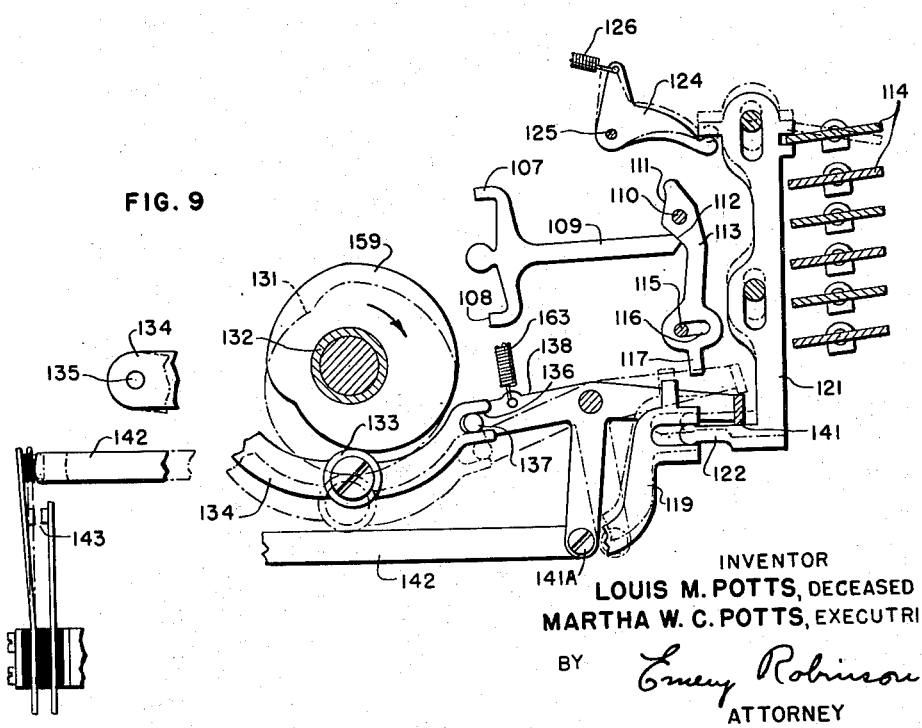
Fig. 9 is a detail view of the printer ciphering mechanisms.

From the foregoing description it is evident by an inspection of Fig. 7 that unlike conditions of pins 32 carried by selecting fingers 27 with respect to the notches 55 of arms 54 of ciphering levers 53 will permit associated transmitting levers 34 to pivot at 35 when its lug 37 is allowed to enter notch 38 of an associated cam 39 as cam sleeve 56 is released for rotation, as will be explained. This results in a transmission of a marking or current impulse. On the other hand, it is evident that like conditions of selecting fingers 27 and ciphering levers 53 enable arm 54 to block upward movement of pin 32, thereby resulting in transmission of a spacing or no current impulse.

With particular reference to Fig. 3, the circuit for operation of coding magnets 42 will now be described. When it is desired to perform a ciphering operation manual switch 61 is moved to the left in its ciphering position as illustrated in Fig. 3. This operation causes extinguishment of green signal lamp 62 and illumination of red signal lamp 63 over obvious circuits to indicate that a ciphering operation is taking place. The code magnets 42 are controlled by means of a key tape 64, which is sensed by sensing levers 65 which control transmitting levers 66 to thereby operate associated contact pairs 67 in the usual manner.

Since there is no coding permutation set up by the magnets 42 at the commencement of a ciphering operation, the first signal transmitted will be a plain English signal which forms no part of the message and is transmitted solely to condition the ciphering mechanisms for subsequent operations. When this signal is sent, reference to Fig. 7 will show that selecting finger 27 and pin 32 thereon will perform its normal function since as shown at A and B in Fig. 7, all ciphering levers will be in their spacing positions as no code magnets are energized. In other words, a plain English signal will be transmitted.

When the first signal is sent by operation of the keyboard, sleeve 56 is released by a single revolution clutch in the conventional manner. When this occurs, locking lever 96 will pivot at 97 under influence of spring 99 in a counterclockwise direction and by means of its blade 98 block movement of selecting fingers 27 and ciphering levers 53 through cooperation with lugs 68 carried by selecting fingers 27 and with lugs 69 carried by arms 54 of ciphering levers 53. At this time apex 57 of cam 58 moves in a counterclockwise direction, as viewed in Fig. 1, and follower 59 carried by locking lever 96 drops to the low part of the cam. Thus, during transmission of the signal by the sequential operation of contact pairs 36, selecting fingers 27 and ciphering levers 53 are held stationary. It should be remembered that in a keyboard transmitter of the type disclosed in the present invention the permutation bars 23 are set immediately upon depression of a key prior to the operation of locking lever 96 and a single revolution clutch not shown is operated which releases cam sleeve 56 for a single revolution.

Simultaneously with the operation of locking lever 96, contact pair 71 mounted with an insulating portion 72 of blade 73 thereof resting on locking lever 96, are closed and in so closing assist locking lever 96 in its counterclockwise pivotal movement, since normally in the rest position of cam 58 the longer blade 73 of the contact pair 74 is under tension.

Closure of contact pair 71 provides an obvious circuit for clutch magnet 74 which becomes energized and which controls a conventional single revolution clutch, not shown, and thereby releases cam sleeve 75 for a single rotation. Five cams 76 fixed to cam sleeve 75 are each cut with a notch 77 at a position timed approximately with the No. 3 impulse of the keyboard transmitter. A sixth cam 78 is also provided which is cut with a notch 79a corresponding approximately to the No. 2 impulse of the keyboard transmitter. The function of the sixth cam 78 is to control the locking circuit for the transfer relays 79 which initially become energized by closure of selected contact pairs 67 depending on the key signals afforded by key tape 64. This initial circuit extends from battery, through switch 61, through the winding of relay 79, over conductor 81, through closed contact pair 67 and over conductor 82 to ground. When front armature 83 is pulled up by relay 79 an obvious locking circuit is provided extending over conductor 84 and through closed contact pair 85. Operation of back armature 86 of a particular relay 79 is effective to provide an obvious circuit over conductor 87 for energizing coding magnets 42.

When cam sleeve 75 is released for rotation upon energization of clutch magnet 74, cam 78 will function approximately during the No. 2 impulse of the keyboard transmitter to open contact pair 85, de-energizing transfer relays 79 by breaking the above described locking circuits and causing therewith de-energization of coding magnets 42 and erasure of key signals stored therein. However, as already pointed out, no coding magnets 42 are energized during the transmission of the first signal but for subsequent signals opening of contact pair 85 will produce the desired results. Immediately following the opening and closing of contact pair 85, selected sensing levers 65 which are sensing perforations in tape 64 allow their associated transmitting levers 66 to close contact pairs 67. This enables the energization of coding magnets 42 according to the first key signal. Ciphering bars 41 may move to their selected positions as locking lever 96 is raised by the follower 59 when the rest position of sleeve 56 is approached.

When the operator depresses a key to send the first enciphered signal, a key signal will have been stored in coding magnets 42 and ciphering bars 41 will have been set accordingly. The depression of the key will immediately shift permutation bars 23 in accordance with the original signal. The locking lever 96 will now lock the selecting fingers 27 and the ciphering levers 53 during transmission of an enciphered signal to an outgoing line. The operation of transmitting levers 34 will of course be determined by the joint control exercised by selecting fingers 27 and ciphering levers 53, as graphically represented in Fig. 7, thus ensuring the transmission of an enciphered code signal.

With particular reference to Figs. 3 to 14, inclusive, the printer ciphering mechanism used for deciphering incoming signals transmitted by a keyboard transmitter, such as disclosed in Fig. 1, will now be described. Numeral 101 indicates generally the printing portion of a combined printing telegraph apparatus similar to the apparatus disclosed in the patent of S. Morton et al. referred to above. In this type of printing apparatus, incoming signals are received by a selector magnet 102 which operates an armature 103 in accordance with received signals which in the instant case are enciphered signals being received from a distant station. Connected with armature 103 is an armature extension 104 whose arms 105 and 106 are designed to cooperate respectively with arms 107 and 108 of five swords 109. In each operation of the swords they are moved back and arms 107 or 108 respectively engage either arm 105 or 106 of armature extension 104 according to incoming signals, resulting in the shifting of the swords to either their marking or spacing position so that on the forward movement thereof the pointed end of the sword will engage either surface 111 or 112 of levers 113. The reciprocation of the swords 109 is accomplished by means of a cam sleeve, not shown, which is controlled by a conventional single revolution clutch. This type of selector is well known in the art and its operation is completely disclosed in the Morton et al. patent.

Ordinarily swords 109 control the operation of the printer selector vanes 114 by means of a series of T-levers not shown in the present invention since the type of printing telegraph apparatus herein disclosed is designed for performing deciphering operations in addition to operating to receive plain English signals. Levers 113 which are pivoted at 110 and have a limited movement afforded by the pin 115 and slots 116, have a projecting end 117 designed to cooperate with a projecting end 118 of ciphering slides 119. The relative positions of the projecting ends 117 and 118 will determine whether a vertical slide 121 which has a rounded arm 122 in engagement with slot 123 of ciphering slides 119 will be permitted to move up, when the vanes 114 are not locked, by bell cranks 124 pivoted at 125 and normally urged in a counterclockwise direction by springs 126. The positions of slides 119 are governed by operation of armatures 126a of key coding magnets 127 to which they are pivotally attached at 128. Armatures 126a are normally urged in a clockwise direction as viewed in Fig. 8 about shaft 129 by springs 150. Articulated to each vertical slide 121 by bifurcation 120 are the vanes 114 which are normally in their spacing position but pivot to a clockwise or marking position when an associated slide 121 is permitted to move upward. It should be mentioned at this time for the sake of clarity that the normal position of the slides 119 to the left is the spacing position while the position to the right is the marking condition. Likewise, the position of levers 113 to the right is the marking position while the position to the left is the spacing position. When a nonblocking or marking condition exists with respect to projections 117 and 118, slides 121 will be enabled to move up, thereby actuating associated vanes 114 to their marking positions. If like or blocking conditions exist between projections 117 and 118 it is apparent that slides 121 will not be able to move up and the associated vanes 114 will remain in their spacing position. These blocking and nonblocking conditions are illustrated in Figs. 8 and 11 to 13.

For controlling the ciphering operation the printing cam 131 mounted on sleeve 132 (Fig. 9) is utilized. Printing cam 131 is a standard part of printing telegraph apparatus of this type and controls the operation of the printing bail, not shown, which operates a selected pull bar also not shown, the selection of which is controlled by the printing vanes 114. In the path of the high part of printing cam 131 is normally positioned a follower 133 carried by lever 134 which is pivoted near its rear extremity at 135. The front end of lever 134 is slotted at 136 whereat it is engaged by a pin 137 supported on a T-shaped lever 138 which includes a bail 141 which overlies arms 122 of the vertical slides 121. T-shaped lever 138 is normally urged in a clockwise direction as viewed in Fig. 8 by means of spring 163. The T-shaped lever 138 is pivotally connected at 141a to a rearwardly extending lever 142, the rearward extremity of which normally holds a contact pair 143 in its open position.

The circuit shown in Fig. 14 for controlling the operation of coding magnets 127 will now be described. For deciphering incoming signals, a key tape 144 is provided which is identical with the key tape at the transmitting station and occupies the same relative position. To sense perforations in tape 144 a series of tape sensing levers 145 are provided which control the operation of transmitting levers 146 in the usual manner to permit contact pairs 147 to close or remain open depending upon the permutation afforded in key tape 144.

When a particular sensing lever 145 moves into a perforation allowing closure of a contact pair 147 a circuit is made for an associated transfer relay 148. Attraction of front armature 149 provides an obvious locking circuit for transfer magnet 148 extending over common conductor 151 and through contact pair 152 which is under the control of a sixth cam 153 notched approximately for operation during receipt of the No. 2 element or impulse by the receiving selector magnet 102. The five transmitting cams 154 which control contact pairs 147 are notched approximately for operation during receipt of the No. 4 element or impulse by selector magnet 127. When armature 155 of transfer relay 148 is attracted an obvious circuit is provided for its associated coding magnet 127.

In order that the invention may be properly understood a typical deciphering operation will now be described. At the commencement of the deciphering operation by prearrangement with the transmitting station, manual switch 156 will be moved to the left which extinguishes the green signal lamp 157 and illuminates the red signal lamp 158 indicating a deciphering operation is taking place.

It will be recalled that to start the keyboard transmitter disclosed in Fig. 1 into operation a plain English signal forming no part of the message is transmitted over the line. This plain English signal has the additional function of conditioning the printer for subsequent deciphering operations. When this first signal is received by selector magnet 102, swords 109 will be positioned according to the signal code combination received. Towards the end of the revolution of the cam sleeve, not shown, controlling the swords 109, cam sleeve 132 will be released by operation of its clutch throwout lever 130 which is under the control of the sword cam sleeve. Upon the first release of cam sleeve 132, printing bail cam 131 rotates and its high part engages follower 133 of lever 134 which now pivots about its pivot 135 in a clockwise direction, and through the engagement of its slot 136 with pin 137 carried by T-lever 138, pivots T-lever 138 in a counterclockwise direction, lifting the bail 141 from holding engagement with arms 122 of vertical slides 121. Selected vertical slides 121 will now move up through operation of bell cranks 124 by their springs 126 and operate vanes 114 accordingly. In this connection it should be remembered that at the commencement of a ciphering operation all ciphering slides 119 are in their leftward or spacing position, in which position levers 113 will be set to permit plain English signal code combinations to be transferred to the vanes 114.

Shortly after the vanes 114 are set for the signal code combination, the function bail, not shown, locks the vanes during the printing operation. The function bail is controlled by a function bail cam 159 (Fig. 9) which is mounted upon the cam sleeve 132. In the latter part of the revolution of cam sleeve 132, after the printing operation is performed, vanes 114 are again unlocked, but at this time bail 141 of T-lever 138 is prepared to assume a position resting on arms 122 of vertical slides 121 holding the vertical slides 121 in their downward position. This is due to the fact that in the latter part of the revolution of printing bail cam 131, a low part thereof is presented to the follower 133 of arm 134 and spring 163 therefore functions to pivot T-lever 138 in a clockwise direction.

It should be remembered that while cam sleeve 132 is rotating, a new signal or the first enciphered signal is being received by selector magnet 102 and the swords 109 are being set to a new position. At this time levers 113 may not be able to move to their new position due to the fact that the vanes may be locked and bail 141 of T-lever 138 is in its upward position, permitting some projections 117 and 118 to block each other. However, since swords 109 reciprocate and pivot in each cycle of the operation, in their backward stroke they will acquire their new setting and in their forward movement rest against either surface 111 or surface 112 of levers 113. When vanes 114 are unlocked and bail 141 moves to its downward position upon the second release of cam sleeve 132 the swords 109 may now position levers 113 in accordance with the first enciphered signal. Therefore, by reason of the locking of the vanes 114 and operation of bail 141 a new character may be selected while the previous character is being printed, thus providing a signal overlap arrangement as is usual in this type of printing telegraph apparatus.

As cam sleeve 132 started to rotate, towards the end of the reception of the first or plain English signal by selector magnet 102, T-lever 138 was pivoted in a counterclockwise direction thereby moving the rearwardly extending lever 142 to the right permitting closure of contact pair 143. This provides an obvious circuit for a clutch magnet 161 (Fig. 14) which causes operation of a single revolution clutch, not shown, releasing cam sleeve 162 for operation. It should be borne in mind that at this time the second signal or first enciphered signal code is being set up by swords 109 as explained. Approximately during reception of the No. 2 impulse by selector magnet 102 cam 153 will open contact pair 152 breaking the locking circuit extending over conductor 151 for transfer relays 148. However, since none of the relays 148 are energized during reception of the first or plain English signal no circuit is actually broken but on subsequent operations previous signal code combinations stored in transfer relays 148 will be erased and cause a corresponding erasure of the signals stored in coding magnets 127. Approximately during reception of the No. 4 impulse by selector magnet 102 sensing levers 145 will feel for perforations in the key tape 144 set to the same position on the identical key tape at the transmitting station and accordingly contact pairs 147 will be permitted by cams 154 to close in the permutation afforded by the key tape 144 at this time. Selected transfer relays 148 will thus be energized and immediately lock up since contact pair 152 is again closed at this time. As selected code magnets 127 are energized at this time they attract armature levers 126a in a counterclockwise direction about the rod 129, thereby tending to move associated ciphering slides 119 to the right or marking position. Since the vanes 114 are unlocked approximately during the receipt of the No. 4 impulse by selector magnet 102 while the tape sensing operation is being performed, selected slides 119 may be temporarily restrained from operation depending on the exact timing if their projections 118 interfere with the projections 117 of levers 113. However, as soon as the vanes 114 are unlocked slides 119 may move to the right since coding magnet 127 at this time remains energized.

Towards the end of the second revolution of the cam sleeve which controls swords 109, cam sleeve 132 is released for operation, cam 131 operates against follower 133 of lever 134 to thereby pivot T-lever 138 in a counterclockwise direction removing bail 141 from the path of arms 122 of selected vertical slides 121 permitting them to assume their upward position. Shortly thereafter, the vanes 114 are locked and retained in their locking position during the printing operation in which a deciphered plain English signal will be printed. The deciphering operations will continue in the same manner for the remaining portion of the message.

In the just described form of the invention for accomplishing key coding operation two key coding devices are employed in the form of key tapes, one being used for enciphering or transmitting purposes and the other being employed for deciphering or receiving purposes. In a modification of the invention there is provided a control circuit whereby a single key ciphering device in the form of a key tape sensing mechanism may be used for both enciphering and deciphering operations. With reference particularly to Fig. 15 of the drawings this modification will now be described.

Numeral 165 represents a local station which includes a combined keyboard transmitter 166 and printing receiver 101 while a distant station is represented as numeral 168 and includes a combined keyboard transmitter 169 and printing receiver 170. This type of printing telegraph apparatus is disclosed in the S. Morton et al. patent previously referred to above. It is understood that in addition to the standard printing telegraph equipment each station will be equipped with identical key coding devices. By this modification of the invention a transmitting station will send enciphered signals to an outgoing line which will be repeated in the receiving circuit of the transmitting station and deciphered to thereby print a plain English home record.

A key ciphering tape is represented by numeral 171 and controls the selective operation of sensing levers 172 which govern the operation of transmitting levers 173 and is thereby effective to permutatively regulate the closure of associated contact pairs 174 in accordance with key code signals. For enabling the permissive operation of transmitting levers 173, there are provided the usual transmitting cams 175 which in this instance are all notched at 176 for approximately the No. 1 impulse position and are mounted upon the cam sleeve 177. Cam sleeve 177 is under the control of clutch magnet 178 which releases a conventional single revolution clutch, not shown, upon closure of contact pair 160 when clutch throwout lever 130 which releases cam sleeve 132 (Figs. 8 and 9) is operated. The closure of selected contact pairs 174 enables the selective operation of primary storage relays 180 according to key signals under certain circuit conditions to be later described. The primary storage relays 180 selectively govern the operation of double wound relays 179 and 181, which respectively control the energization of selected transmitter coding magnets 182 and selected receiver coding magnets 183.

In addition to the five transmitting cams 175 there are provided on cam sleeve 177, cams 184, 185, and 186 which respectively control make before break contacts 187, 188, and contact pair 189 by means of levers 191, 192, and 193, respectively. Cam 184 is notched at 194 to correspond approximately with the start impulse position of the cam sleeve 177; cam 185 is similarly notched at 195 for the No. 2 impulse position, and cam 186 is similarly notched at 196 for the No. 3 impulse position. These so called impulse positions represent positions in the rotation of the cam sleeve 177 which correspond to the usual five positions and start-stop positions of the Baudot code.

When sensing levers 172 sense perforations in the key tape 171, selected contact pairs 174 will be closed energizing selected primary relays 180 over conductors 194 under certain operating conditions which will later appear. When a primary relay 180 is energized a locking circuit therefor is provided through attracted armature 495, over conductor 496 and through contact pair 189 controlled by cam 186. Attraction of armature 197 by a primary relay 180 prepares a circuit for transferring a selection from a primary relay 180 to double wound relay 179, when the normally open pair of the make before break contacts 187 are closed, over conductors 198, through armature 197, over conductor 199 and through the left winding of double wound relay 179.

Energization of a double wound relay 179 causes the transfer of the selection to an associated transmitter coding magnet 182 by attraction of armature 205 while attraction of its armature 206 provides a locking circuit for double wound relay 179 extending through its right winding, through armature 206, over conductor 207 and through the normally closed contact pair of the make before break contacts 187.

Attraction of armature 208 by a primary relay 180 prepares a circuit for transferring a selection from a primary relay 180 to a double wound relay 181, when the normally open pair of the make before break contacts 188 are closed, over a conductor 209, through armature 208, over a conductor 211 and through the right winding of double wound relay 181. Attraction of armature 212 by a double wound relay 181 transfers a selection to associated printer receiving coding magnets 183 while attraction of its armature 213 provides a locking circuit for double wound relay 181 extending through its left winding, through armature 213, over conductor 214 and through the normally closed contact pair of the make before break contacts 188.

To facilitate a ready understanding of this modification of the invention, a description of a typical ciphering operation will now be undertaken. At the commencement of ciphering operations manual switch 214 is moved to the left extinguishing green signal lamp 215 and illuminating red signal lamp 216, over obvious circuits and indicating that a ciphering operation is taking place. In order to condition both the local station 165 and distant station 168 for ciphering operations two plain English signals chosen at random are first transmitted which form no part of the message proper. It is necessary that these two plain English signals be transmitted in order that the control circuit be conditioned to afford key ciphering signal code combinations for both the transmitter and receiver at a given station. All signals sent over the line 213 to distant station 168 will be repeated by the selector magnet 102 at the local station and printed after being deciphered by the receiver 101.

Upon the transmission of the first plain English signal, cam sleeve 132 (Fig. 9) is released as explained by operation of clutch throwout lever 130 which immediately results in the closure of contact pair 160, providing an energizing circuit for clutch magnet 178 extending over conductor 190, thereby releasing cam sleeve 177. When cam sleeve 177 is released, make before break contact 187 operates to erase the previous selection existing in code magnets 182 during the start interval of cam sleeve 177 by opening the locking circuit for double wound relays 179, thereby causing de-energization of the associated code magnets 182. However, during the first revolution of cam sleeve 177 no coding magnets 182 are yet energized. When make before break contact 187 operates to erase the selection previously existing in code magnets 182, it also functions to acquire a new selection for the code magnets 182 from primary storage relays 180 but again it must be remembered that at this time no primary relays 180 are yet energized. Make before break contacts 188 function in the same manner as contacts 187 but during the No. 2 impulse period of cam sleeve 177. During the No. 3 impulse period, contact pair 189 opens to erase the selection existing (if one had existed) on primary relays 180 by breaking its locking circuit. When cam sleeve 177 reaches its No. 5 position as the sensing levers 172 operate, the first ciphering selection will now be acquired for primary storage relays 180.

When the second plain English character is transmitted, contact pair 160 will be closed by clutch throwout lever 130 as described releasing cam sleeve 177 for its second revolution. During the start impulse, make before break contacts 187 operate as before but now enable the double wound relays 179 to acquire the selection existing in primary storage relays 180 and transfer the first key ciphering selection to transmitter coding magnets 182 which lock up as previously described. Make before break contacts 188 will perform a similar function for receiver code magnets 183 during the No. 2 period of operation of cam sleeve 177. During the No. 3 period, contact pair 189 will open to erase the selection existing in the primary relays 180 which will acquire the second ciphering selection from key tape 171 when cams 175 reach the No. 5 position as tape sensing levers 172 operate.

Now when the keyboard transmitter 166 is operated a third time, ciphering bars 41 (Fig. 1) will have been set to the positions representative of the first key ciphering signal and accordingly the first enciphered signal will be transmitted. Likewise ciphering slides 119 (Fig. 8) will have been set to positions representative of the first key signal and receiver 101 will function to decipher the first enciphered signal repeated by selector magnet 102 to print the character in plain English form. As cam sleeve 177 is released for the third time it should be mentioned that the make before break contact 188 is timed to operate after the printing vanes lock to insure that the same key signal used for enciphering will be used for deciphering. The cycles of operation described will now be repeated as the remaining portion of the ciphering operation proceeds. It is obvious from an inspection of the circuit shown in Fig. 15 that the ciphering system may be operated in either direction of transmission, with the identical key tape at each station occupying the same positions.

Various changes and modifications may be made in the above described invention without a departure from the spirit and scope of the invention as defined in the following claims.

What is claimed is:

1. A ciphering selector for a transmitter comprising a plurality of slidable permutation bars operable according to original code combinations, an equal number of selecting levers controlled by said permutation bars, a like number of key signal responsive code magnets, a series of slidable ciphering bars controlled by said coding magnets, a plurality of ciphering levers individually associated with said ciphering bars, a set of transmitter levers operable under the joint control exercised thereover by said selecting fingers and said ciphering levers, and means controlled during the transmission of one resultant signal code combination by said transmitting levers for energizing said code magnets in accordance with the next key code combination for thereby setting said ciphering bars for the next operation.

2. In a ciphering selector for a printer, a selector magnet for receiving incoming signals including a set of swords controlled by said magnet, an equal number of levers controlled by said swords and having interfering members carried thereby, a set of key signal controlled coding magnets, a plurality of ciphering slides operable by said coding magnets and having interfering members, a set of printer selector vanes, means controlled by the joint positioning of said interfering members for determining the ultimate position of said printer vanes and means operable during the utilization of a signal code combination provided by said printer selector vanes for a printing function for energizing said code magnets in accordance with the next key signal code combination for thereby setting said ciphering slides for the next operation.

3. In a ciphering transmitter, in combination, a plurality of slidable permutation bars operable according to original code combinations, an equal number of selecting fingers controlled by said permutation bars, a like number of key signal responsive code magnets, a series of slidable ciphering bars controlled by said coding magnets, a plurality of ciphering levers individually associated with said ciphering bars, and a circuit arrangement operable during the utilization of a key code combination for one operation for erasing the previous key code combination established by said second mentioned members and preparing a new key code combination therefor for the next operation.

4. In a telegraph receiver, in combination, a selector including a selector magnet for receiving incoming signals and a set of swords controlled by said magnet, an equal number of levers having interfering members carried thereby and controlled by said swords, a set of key code combination controlled coding magnets, a plurality of ciphering slides operable by said coding magnets and having interfering members, a set of printer selector vanes, and a circuit arrangement operable during the utilization of a code combination established by said printer selector vanes for a printing operation for erasing the previous key code combination existing in said code magnets and preparing a new key code combination therefor for the next printing operation.

5. A combined transmitting and receiving apparatus, a set of code magnets for the transmitting apparatus, a set of code magnets for the receiving apparatus, a single key coding device for controlling both of said sets of magnets, a series of transmitting levers, mechanical means controlled by said first mentioned set of magnets for varying the normal operation of said transmitting levers according to key code combinations furnished by said key coding device for producing resultant enciphered signals, a selector magnet for receiving said resultant enciphered signals, selector members controlled by said selector magnet, a series of printer selector vanes, and mechanical means controlled by said second mentioned set of magnets and cooperating with said selector members for varying the normal operation of said printer selector vanes according to identical key code combinations for producing resultant deciphered signals.

6. A combined transmitting and receiving apparatus, a set of code magnets for the transmitting apparatus, a set of code magnets for the receiving apparatus, a single key coding device for controlling both of said sets of magnets, a series of transmitting levers, mechanical means controlled by said first mentioned set of magnets for varying the normal operation of said transmitting levers according to key code combinations furnished by said key coding device for producing resultant enciphered signals, a series of printer selector vanes, and mechanical means controlled by said second mentioned set of magnets for varying the normal operation of said printer selector vanes according to identical key code combinations for producing resultant deciphered signals and a circuit arrangement for controlling said key coding device.

7. A combined transmitting and receiving apparatus, a set of code magnets for the transmitting apparatus, a set of code magnets for the receiving apparatus, a key coding device for controlling both of said sets of magnets, said transmitter including a set of transmitting levers, means under the control of said first mentioned set of magnets for altering the normal operation of said transmitting levers, a receiver including a set of printer selector vanes, means under the control of said second mentioned set of magnets for altering the normal operation of said printer selector vanes, and a circuit arrangement for said key coding device for providing key code combinations for each of said sets of magnets and prior thereto erasing key code combinations previously existing in said sets of magnets.

8. In a combined telegraph transmitting and receiving apparatus, a transmitter including a set of transmitting levers, a receiver including a set of printer selector vanes, a key coding device for altering the normal operation of said levers and vanes, and a circuit arrangement for providing key code combinations for said key coding device including a set of primary relays for storing key code combinations, a set of code magnets for said transmitter, a set of code magnets for said receiver, means to transfer key code combinations from said primary relays to each of said set of code magnets, and means to erase previously existing key code combinations in said primary relays and both of said sets of code magnets, said transfer means and said erasing means being properly timed to enable the use of identical key code combinations by said transmitter and said receiver for any given signal code combination transmitted by said transmitter.

9. A telegraph apparatus including an enciphering and a deciphering means, a single key coding device for providing key code combinations for both of said means, a set of primary relays for storing key code combinations, a set of key code magnets for said enciphering means, a set of key code magnets for said deciphering means, means to transfer signal code combinations from said primary relays to each set of said key code magnets and means to erase previously existing key code combinations in said primary relays and both of said sets of code magnets, said transfer means and said erasing means being properly timed to enable the use of identical key code combinations by said enciphering and said deciphering means for any given code combination.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
| --- | --- | --- |
| 2,317,995 | Krum | May 4, 1943 |
| 2,406,829 | Haglund et al. | Sept. 3, 1946 |
| 2,449,789 | Reiber | Sept. 21, 1948 |